United States Patent [19]

Rodriguez

[11] Patent Number: 5,325,082
[45] Date of Patent: Jun. 28, 1994

[54] COMPREHENSIVE VEHICLE INFORMATION STORAGE SYSTEM

[76] Inventor: Juan C. Rodriguez, 700 S. Louise St. Apt. A, Glendale, Calif. 91205

[21] Appl. No.: 978,427

[22] Filed: Nov. 19, 1992

[51] Int. Cl.$^5$ .............................................. B60Q 1/00
[52] U.S. Cl. ................................... 340/438; 340/439; 340/521; 340/517; 340/459; 364/424.03; 364/424.04
[58] Field of Search ...................... 364/424.03, 424.04; 340/438, 439, 521, 517, 459

[56] References Cited

U.S. PATENT DOCUMENTS

| | | | |
|---|---|---|---|
| 4,082,370 | 4/1978 | Leiber et al. | 340/52 B X |
| 4,258,421 | 3/1981 | Juhasz et al. | 364/424.04 |
| 4,271,402 | 6/1981 | Kastura et al. | 340/52 |
| 4,817,040 | 3/1989 | Bodley-Scott | 364/424.04 |
| 4,831,560 | 5/1989 | Zaleski | 364/424.03 |
| 4,987,541 | 1/1991 | Levente et al. | 364/424.04 |
| 5,034,889 | 7/1991 | Abe | 364/424.04 |
| 5,047,944 | 9/1991 | Ishikawa et al. | 364/424.04 |
| 5,055,825 | 10/1991 | Yang | 364/424.03 |
| 5,058,044 | 10/1991 | Stewart et al. | 364/424.04 |
| 5,072,391 | 12/1991 | Abe | 364/424.04 |
| 5,107,425 | 4/1992 | Donges et al. | 364/424.03 |

*Primary Examiner*—John K. Peng
*Assistant Examiner*—Nina Tong
*Attorney, Agent, or Firm*—B. J. Powell

[57] ABSTRACT

A vehicle information storage system for all vehicle electronic sensors comprising a condition monitoring subsystem(7) and a storage subsystem(9). The condition monitoring subsystem(7) comprises, display(30), warning lamps(32), and a central processing unit(24) with a microprocessor and memory. The storage subsystem(9) comprising a central data processor(31) with a plurality of storage devices(16) one for each of a plurality sensor inputs(11), a plurality of remote receiving units(10), and a data routing unit(14). All the sensor inputs in the storage subsystem(7) are connected to the central data processor(31) over a single wire with the centrally located data routing unit(14) and the plurality of remote receiving units(10). Each sensor input(11) is monitored according to the information content of the associated sensor data as determined by prior analysis. Each sensor data associated with each sensor input(11) is stored in a corresponding storage device(16) and is transmitted via the vehicle electronic interface(26) to the central processing unit(24) in the condition monitoring subsystem(7) or to an external computer. The central processing unit(24) in the condition monitoring subsystem(7) processes and stores some of the data associated with the sensor inputs(11). All the remaining sensor data associated with all the remaining vehicle electronic sensors is stored exclusively in the central data processor(31).

18 Claims, 7 Drawing Sheets

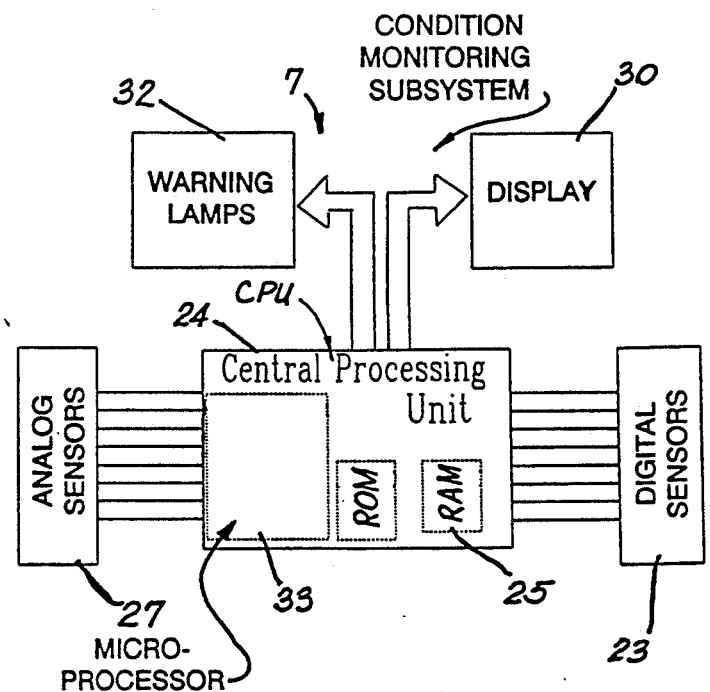
Prior Art
FIG.1
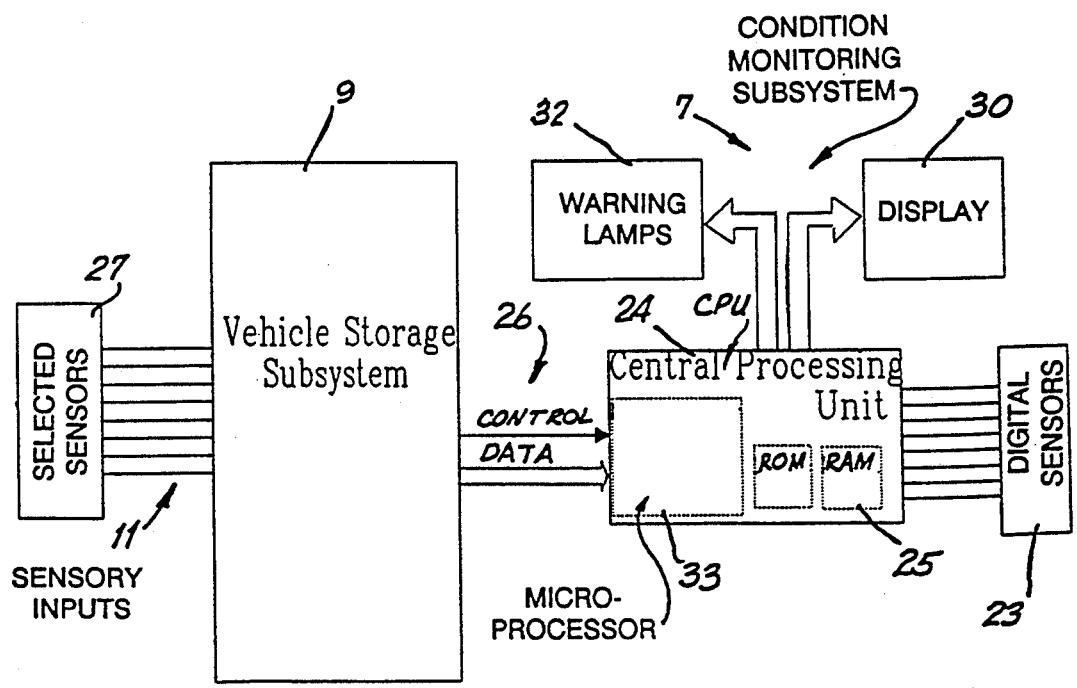
FIG.1-A

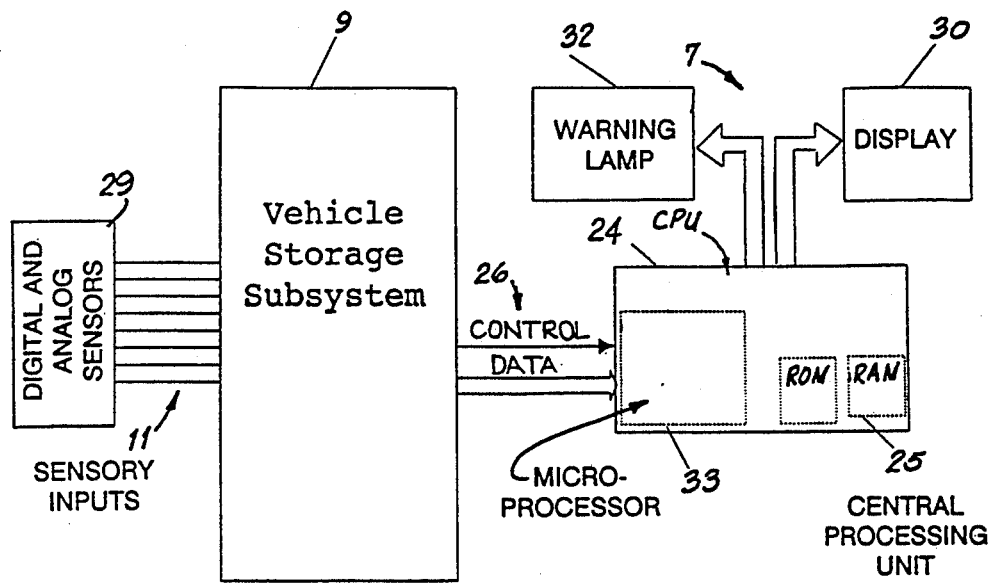
FIG.1-B
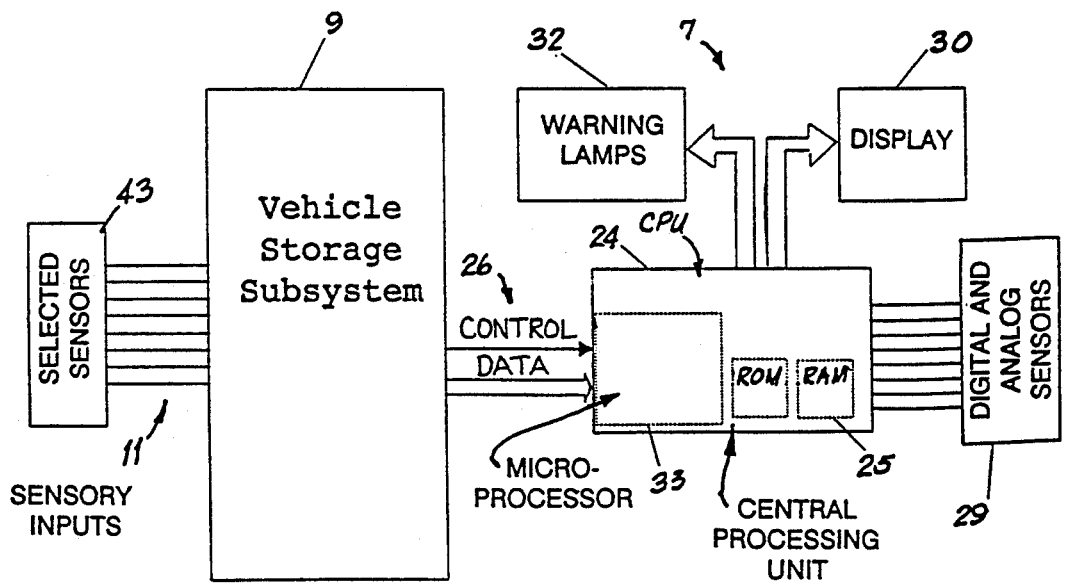
FIG.1-C

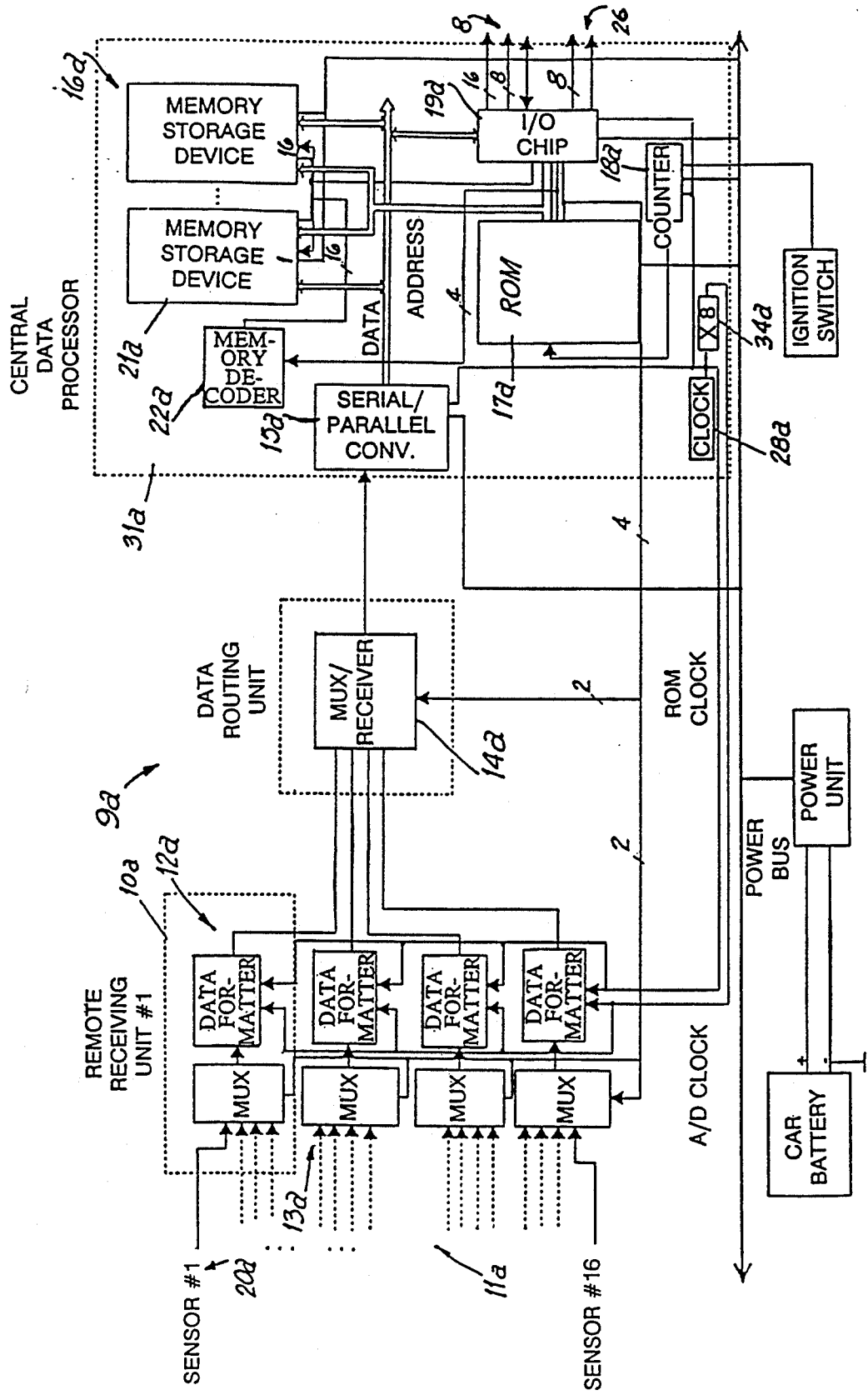
FIG 2-A

FIG 5

| ROM INPUT | MUX DECODER OUTPUT | | | | MEMORY DECODER | | | | MEMORY ADDRESS 16 BITS | | | | | | | | | | | | | | | |
|---|---|---|---|---|---|---|---|---|---|---|---|---|---|---|---|---|---|---|---|---|---|---|---|---|
| | B0 | B1 | B2 | B3 | C0 | C1 | C2 | C3 | A0 | A1 | A2 | A3 | A4 | A5 | A6 | A7 | A8 | A9 | A10 | A11 | A12 | A13 | A14 | A15 |
| 0000H | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |
| 0001H | 0 | 0 | 0 | 1 | 0 | 0 | 0 | 1 | 0 | 0 | 0 | 0 | 0 | 0 | 0 | 0 | 0 | 0 | 0 | 0 | 0 | 0 | 0 | 0 |
| 0002H | 0 | 0 | 1 | 0 | 0 | 0 | 1 | 0 | 0 | 0 | 0 | 0 | 0 | 0 | 0 | 0 | 0 | 0 | 0 | 0 | 0 | 0 | 0 | 0 |
| 0003H | 0 | 0 | 1 | 1 | 0 | 0 | 1 | 1 | 0 | 0 | 0 | 0 | 0 | 0 | 0 | 0 | 0 | 0 | 0 | 0 | 0 | 0 | 0 | 0 |
| 0004H | 0 | 1 | 0 | 0 | 0 | 1 | 0 | 0 | 0 | 0 | 0 | 0 | 0 | 0 | 0 | 0 | 0 | 0 | 0 | 0 | 0 | 0 | 0 | 0 |
| 0005H | 0 | 1 | 0 | 1 | 0 | 1 | 0 | 1 | 0 | 0 | 0 | 0 | 0 | 0 | 0 | 0 | 0 | 0 | 0 | 0 | 0 | 0 | 0 | 0 |
| 0006H | 0 | 1 | 1 | 0 | 0 | 1 | 1 | 0 | 0 | 0 | 0 | 0 | 0 | 0 | 0 | 0 | 0 | 0 | 0 | 0 | 0 | 0 | 0 | 0 |
| 0007H | 0 | 1 | 1 | 1 | 0 | 1 | 1 | 1 | 0 | 0 | 0 | 0 | 0 | 0 | 0 | 0 | 0 | 0 | 0 | 0 | 0 | 0 | 0 | 0 |
| 0008H | 1 | 0 | 0 | 0 | 1 | 0 | 0 | 0 | 0 | 0 | 0 | 0 | 0 | 0 | 0 | 0 | 0 | 0 | 0 | 0 | 0 | 0 | 0 | 0 |
| 0009H | 1 | 0 | 0 | 1 | 1 | 0 | 0 | 1 | 0 | 0 | 0 | 0 | 0 | 0 | 0 | 0 | 0 | 0 | 0 | 0 | 0 | 0 | 0 | 0 |
| 000AH | 1 | 0 | 1 | 0 | 1 | 0 | 1 | 0 | 0 | 0 | 0 | 0 | 0 | 0 | 0 | 0 | 0 | 0 | 0 | 0 | 0 | 0 | 0 | 0 |
| 000BH | 1 | 0 | 1 | 1 | 1 | 0 | 1 | 1 | 0 | 0 | 0 | 0 | 0 | 0 | 0 | 0 | 0 | 0 | 0 | 0 | 0 | 0 | 0 | 0 |
| 000CH | 1 | 1 | 0 | 0 | 1 | 1 | 0 | 0 | 0 | 0 | 0 | 0 | 0 | 0 | 0 | 0 | 0 | 0 | 0 | 0 | 0 | 0 | 0 | 0 |
| 000DH | 1 | 1 | 0 | 1 | 1 | 1 | 0 | 1 | 0 | 0 | 0 | 0 | 0 | 0 | 0 | 0 | 0 | 0 | 0 | 0 | 0 | 0 | 0 | 0 |
| 000EH | 1 | 1 | 1 | 0 | 1 | 1 | 1 | 0 | 0 | 0 | 0 | 0 | 0 | 0 | 0 | 0 | 0 | 0 | 0 | 0 | 0 | 0 | 0 | 0 |
| 000FH | 1 | 1 | 1 | 1 | 1 | 1 | 1 | 1 | 0 | 0 | 0 | 0 | 0 | 0 | 0 | 0 | 0 | 0 | 0 | 0 | 0 | 0 | 0 | 0 |

COMPREHENSIVE VEHICLE INFORMATION STORAGE SYSTEM

BACKGROUND

This invention relates generally to information storage systems and more particularly to systems for vehicle information storage to improve reliability and serviceability of the vehicle in the absense of hard malfunctions or faults in the vehicle during poor vehicle performance.

Today's vehicle condition monitoring systems are typical features in most vehicles. They routinely monitor the sensors in the vehicle for malfunctions and store the sensor data in memory to aid service technicians or mechanics in pinpointing malfunctions in the electronics or the engine. Unnecessary replacement of parts after incorrect diagnosis by mechanics reflect the shortcomings in the condition monitoring systems currently available. These shortcomings could be eliminated if more sensor data was stored in memory in order to assist the mechanics in identifying problems before they occur.

A typical condition monitoring system comprises a central processing unit, a central lamp failure unit, and a display unit. The central processing unit is usually microprocesor-based and all sensor data from around the vehicle is fed back to this unit via parallel inputs. The microprocessor decodes all the input states to determine valid and non-valid inputs together with sensor failure data and it generates output signals for the display module. The central processing unit also contains memory storage devices to store data on vehicle past history performance. With this current architecture, to increase the amount of vehicle sensor data stored in memory would require faster microprocessors, reduced data processing, and improved microprocessor addressing schemes.

SUMMARY OF THE INVENTION

The invention disclosed herein provides a reliable and fast means for storing vehicle sensor data intelligently and efficiently without microprocessor control. The solution is to allocate storage to an external subsystem that does not use the microprocessor in the central processing unit in order to store all the data, with the subsystem connectable to the central processing unit. The entire system will constitute a complete vehicle information storage system that incorporates the existing condition monitoring system to perform processing of all the sensor data while the storage subsystem performs continuous and uninterrupted data storage.

In accordance with this invention, there is provided a vehicle information storage system for all vehicle electronic sensors comprising a condition monitoring subsystem and a storage subsystem. The condition monitoring subsystem comprises control electronics, display, and a central processing unit with a microprocessor and memory. The storage subsystem comprising a central data processor with a plurality of storage devices one for each of a plurality sensor inputs, a plurality of remote receiving units, and a data routing unit. All the sensor inputs in the storage subsystem are connected to the central data processor over a single wire with the centrally located data routing unit and the plurality of remote receiving units. Each sensor input is monitored according to the information content of the associated sensor data as determined by prior analysis. Data associated with each sensor input is stored in a corresponding storage device and is transmitted via the vehicle electronic interface to the central processing unit in the condition monitoring subsystem or to an external computer. The central processing unit in the condition monitoring subsystem processes and stores some of the data associated with the sensor inputs. All the remaining sensor data associated with all the remaining vehicle electronic sensors is stored exclusively in the central data processor of the storage subsystem.

The proposed vehicle information storage system accommodates resource allocations more intelligently than in previously proposed condition monitoring systems; and the rate of sampling and the order of data storage of the sensor inputs depend on the information content of the sensor data associated with the sensor inputs. The information content of each sensor input as defined by this invention is directly proportional to the following: the frequency content of the data associated with the monitored sensor input, the probability of a fault occurring that causes the sensor data of the monitored sensor input to fluctuate unusually, and the probability of a malfunction in the sensor.

In the condition monitoring subsystem, data processing and diagnostic processing can be performed faster with unnecessary storage of sensor data by the central processing unit while the storage subsystem stores all the input sensor data associated with the plurality of sensors in the vehicle. The superiority of this system over the existing condition monitoring system is clear since no data processing is involved in storage, and no microprocessors are used to store data into memory. Therefore, all the limitations mentioned before such as microprocessor speed, the microprocessor addressing scheme, and data processing do not limit the efficiency of storage or memory storage capacity of the system. Memory storage in each corresponding memory storage device is periodically filled-up at different rates; and sources monitored more frequently will have their storage devices filled-up sooner. As an example, a storage subsystem for 16 analogue sensors and 1 megabyte of RAM storage dedicated for each of the 16 sensor inputs that samples each input 13 times per second can store data continuously in memory for 7 days before the data is over-written assuming the vehicle is operated on the average 3 hours a day.

The storage of sensor data associated with the sensor inputs in accordance with information content of the data provides another advantage since resources are not used up indiscriminately. The more critical information in sensor inputs can be stored more intelligently. For example, it might be determined that data from sensors #10, #4, and #3 are closely related engine performance information that are critical to insure proper carburetor performance; consequently, the software in the central data processor would include always monitoring data from sensors #10, #4, and #3 in that order at all times. This would constitute optimizing the storage subsystem's software based on the automaker's predicted engine performance by making use of specific design concerns, dynamical vehicle models, or anomalies in performance during vehicle plant performance testing. This information can be programmed into the central data processor in the storage subsystem at the factory before the vehicle is sold to a customer.

The advantage of isolating the remote receiving units and the data routing unit from the central data processor permits remote placement of the remote receiving units close to the engine and/or other vehicle sensors while placing data routing unit at a convenient midway point so that the number of wires used to interconnect units between the sensors and receiving unit, between receiving unit and data routing unit, and between data routing unit and central data processor are reduced. For example, by placing a remote receiving unit with multiple sensor inputs and one multiplexed output close to the engine, the number of wires that interconnect the sensors to the data routing unit is reduced considerably. A similar argument can be applied to the relative placement of the data routing unit to the central data processor. The reduction in wires provides two added advantages, it increases reliability of connectors and reduces the time required to troubleshoot system shorts or open in the wires and malfunctioning sensors.

Further objects and advantages of my invention will become apparent from a consideration of the drawings and ensuing descriptions.

BRIEF DESCRIPTION OF THE DRAWINGS

FIG. 1 is a block diagram of a typical prior art vehicle condition monitoring system;

FIGS. 1a, 1b, 1c are block diagrams showing different embodiments of a distributed vehicle information storage system in accordance with this invention;

FIG. 2a is a detail block diagram of a sixteen sensor input for the vehicle storage subsystem of FIG. 2;

FIG. 3 is a chart showing a typical example of a data storage structure(frame format) for the vehicle storage subsystem in FIG. 2a;

DETAILED DESCRIPTION OF ILLUSTRATIVE EMBODIMENTS

Figure 2:
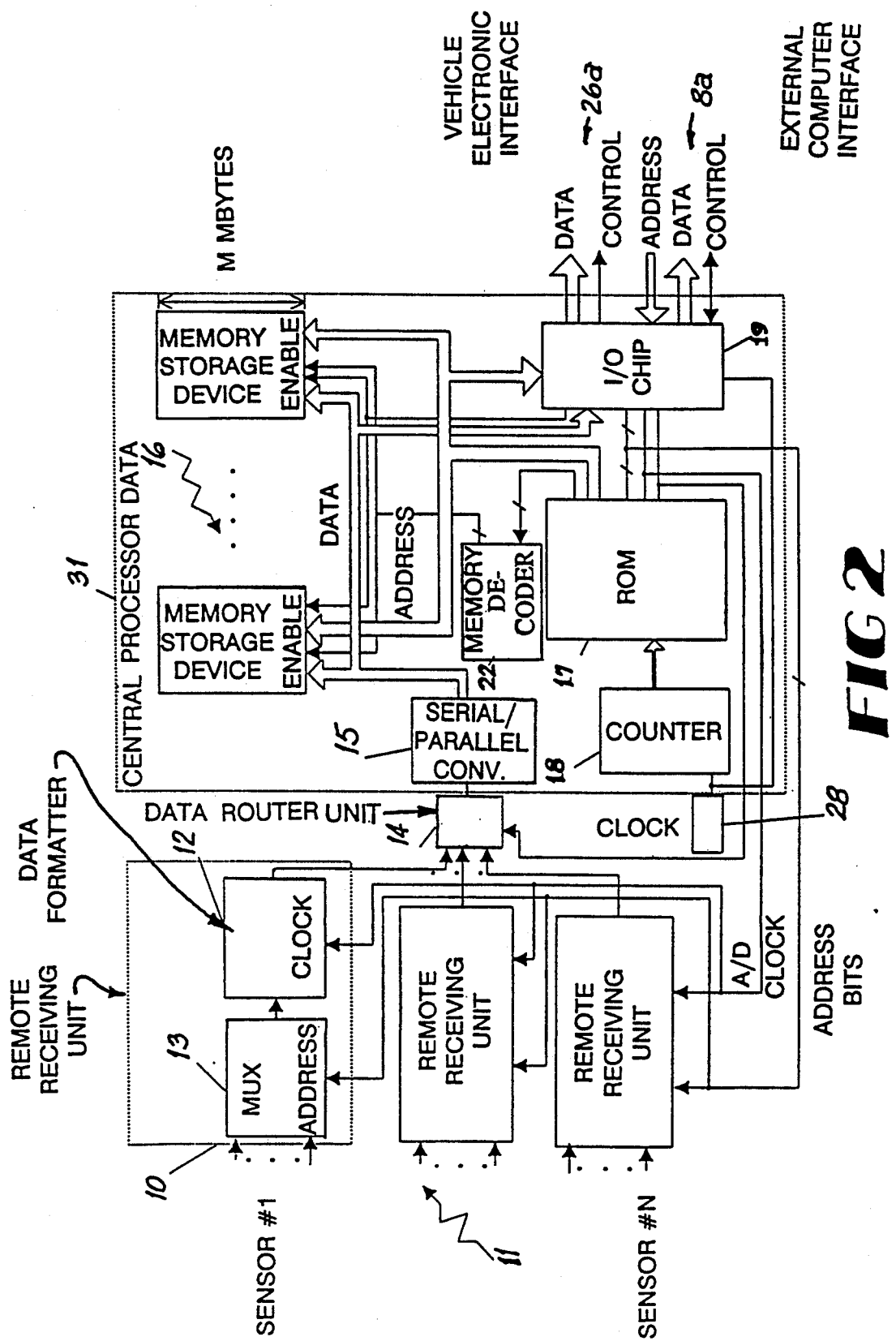
FIG. 2 is a block diagram of the vehicle storage subsystem used in the vehicle information storage system of FIG. 1a, 1b, and 1c.

The system of the invention is a distributed vehicle information storage system that monitors a plurality of sensors as specified by the Read-Only-Memory (ROM) program outputs, multiplexes sensor outputs to reduce wiring interconnections, stores subsequent sensor data in one of the appropriate storage devices corresponding to the sensor input selected, and interfaces with the central processing unit in the condition monitoring subsystem to communicate data to other parts of the vehicle or to communicate data to an external computer system. The system optimizes data gathering to increase information content associated with all the sensor inputs and accordingly monitors data from different sensors at different rates since the known information content of each sensor output is directly proportional to the following: the frequency content of the data associated with the monitored sensor input, the probability of a fault occurring that causes sensor data of the monitored sensor to fluctuate unusually, and the probability of a malfunction in the sensor. The system cycles through the plurality of sensors and monitors critical data or fast varying information more frequently than less critical or slow varying sensor data as determined by the information content of the data. This is accomplished by means of the read-only-memory (ROM) program outputs that enables storage of certain sensor data to occur more frequently than others. The ROM addresses information in memory and enables specified signal path between the plurality of sensors and memory storage modules with the aid of multiplexers and a memory decoder. The program outputs from the ROM are sequenced by the outputs from a digital counter and an on-board clock signal generator. The system is enabled when the car ignition switch in the vehicle is turned "on". After all the contents in memory modules are filled-up, the system writes over the original memory content with new data monitored through the sensors and initial data is lost during repeat cycles.

Prior Art System

FIG. 1 shows a typical present-day vehicle microprocessor-based condition monitoring system 7 comprise digital sensors 23, analogue sensors 27, a central processing unit 24, a display 30 of either fluorescent or liquid crystal type, and warning lamps 32 incorporated in the main instrument panel. Central processing unit 24 comprises, among other things, a microprocessor 33 and a Random-Access-Memory (RAM) storage device 25. Analogue sensors 27 and digital sensors 23 are connected to the central processing unit 24 via parallel wires. The conditions of sensors 23 and 27 are monitored and outputted to the display 30 of either fluorescent or liquid crystal type and warning lamps 32 during actual vehicle malfunction occurrence. The internal RAM storage device 25 is used to store the analogue and digital sensor data associated with sensors 23 and 27 for servicing and troubleshooting of the engine or other vehicle malfunctions at a later data in time.

This Invention

FIG. 1-A shows one of the possible embodiments of the invention for a new vehicle information storage system with digital sensors 23 still connected to the central processing unit 24 via parallel wires and with analogue sensors 27 now connected to the sensors inputs 11 in a vehicle storage subsystem 9. The data associated with analogue sensors 27 are stored in the vehicle storage subsystem 9 and are transmitted to the cental processing unit 24 via a data bus and control bus or vehicle electronic interface 26. FIG. 1-B shows another embodiment of the vehicle information storage system with the vehicle storage subsystem 9 connected to central processing unit 24 via vehicle electronic interface 26 and no direct parallel inputs from sensors 29 to central processing unit 24. The combined vehicle analogue and digital sensors 29 are now connected to the sensor inputs 11 in vehicle storage subsystem 9 where the sensor data is stored and transmitted to central processing unit 24 for further processing. FIG. 1-C shows another embodiment of the vehicle information storage system with the combined vehicle analogue and digital sensors 29 connected to the central processing unit 24 with storage of some but not all the sensor data associated with sensors 29. Selected sensors 43 are now stored in the vehicle storage subsystem 9 and transmitted to the central processing unit 24 via vehicle electronic interface 26 with the remaining sensors 29 stored in the RAM storage device 25. Additionally, the vehicle storage subsystem 9 can be expanded to include other vehicle sensors attached at sensor inputs 11 from other electronic subsystems (not shown) while connected to condition monitoring subsystem 7.

FIG. 2 shows a block diagram of the vehicle storage subsystem 9 in accordance with this invention for N sensor inputs 11. Vehicle storage subsystem 9 has a plurality of remote receiving units 10, a data routing unit 14 such as a multiplexer, and a central data processor 31 as major constituent parts. Each remote receiving unit 10 includes a multiplexer 13 with the sensor inputs 11 connected to the multiplexer and with its output connected to a data formatter 12. The data routing unit 14 is strategically located in the vehicle between the remote receiving units 10 and the central data processor 31 in order to connect with a single wire the outputs from each of the data formatters 12 to the central data processor 31. The central data processor 31 contains memory storage devices such as RAM storage devices 16, a ROM 17, a counter 18, a clock generator 28, a serial-to-parallel converter 15, an I/O interface chip 19, and a memory decoder 22. There are N memory storage devices 16, one for each sensor input 11. The ROM 17 outputs are connected to memory decoder 22, multiplexer 13, data routing unit 14, memory storage devices 16, and I/O interface chip 19. The outputs from the memory decoder 22 are connected to the memory storage devices 16. The timing for the subsystem 9 is provided by the clock generator 28 connected to counter 18 which serves to cycle the system through ROM 17 inputs. The subsystem 9 provides outputs via the vehicle electronic interface 26 and via the computer interface 8.

The general operation of the vehicle storage subsystem 9 will now be described with reference to the block diagram shown in FIG. 2. The subsystem cycles through sensor inputs 11 and monitors the sensor data for storage into memory storage devices 16. This is accomplished by means of the program content of the ROM 17 in the central data processor 31. ROM 17 outputs address information for the memory storage device 16 and enables specified signal paths between sensor inputs 11 and memory storage devices 16 with the aid of multiplexer 13, data routing unit 14, and memory decoder 22. Outputs from ROM 17 are sequenced by the outputs from counter 18. The system is enabled when the car ignition switch is turned on in the vehicle. After the contents of each memory storage device 16 is filled-up, the system writes over the original memory content with new data monitored through sensor inputs 11.

Each remote receiving unit 10 selects, digitizes, and transmits data from its sensor inputs 11 in remote locations of the vehicle. Each remote receiving unit 10 performs sensor data processing for vehicle storage subsystem 9 by sampling the information associated with each of its sensor inputs 11, digitizing the analogue and digital data from its associated sensor inputs with data formatter 12, and transmitting the resulting digital bits of information to data routing unit 14. Data acquisition by the system is accomplished by each multiplexer 13. Each multiplexer 13 in each remote receiving unit 10 is used to select one sensor input 11 from each of the plurality of sensors connected to it for subsequent transmission to each data formatter 12. During each clock cycle of counter 18, the ROM outputs are dumped to address multiplexer 13. Each data formatter 12 connected to each multiplexer 13, takes the selected analogue or digital sensor data associated with the selected sensor input and converts it or digitizes it to serial bytes of information suitable for transmission over a single wire to the data routing unit 14. The data formatter 12 provides the A/D conversion for all sensor inputs by utilizing an internal A/D converter chip(not shown).

The data routing unit 14 selects one of the incoming signals associated with each remote receiving units 10 as determined by ROM 17 outputs and transmits it to central data processor 31. Data routing unit 14 selects for transmission serial bits of information to be sent to the serial to parallel converter 15 in the central data processor 31 every cycle of the clock generator 28. The signal selection process is accomplished by the designated address bits connected to the data routing unit 14 from the ROM 17 outputs. During every cycle of the clock generator 28, the outputs from the ROM 17 connected to data routing unit 14 change accordingly to reflect a different selection of sensor data for transmission.

The central data processor 31 stores subsequent information received from the data routing unit 14 and formats the data with the serial-to-parallel converter 15 before placing the information into the memory storage devices 16. The ROM 17 output bits contains the address in memory to store the processed sensor data and this signal is put on the address bus every cycle of the clock generator 28. Immediately following, memory decoder 22 decodes the output bits from ROM 17 in order to enable one of the memory storage devices 16 that corresponds to sensor input 11 being stored. While the data from sensor inputs 11 is being stored during vehicle operation, I/O interface chip 19 communicates this information to external devices connected to it through the vehicle electronic interface 26 once every cycle of the generator clock 28. During periods of vehicle inactivity, when I/O interface chip 19 senses ignition switch is turned-off, chip 19 sends read signals to the memory storage devices 16 so that the stored data can be read by the external computer for servicing via the computer interface 8 in response to control signals from the external computer. When the I/O interface chip 19 senses normal vehicle operation by detecting the ignition switch being in its closed position, storage of sensor data continues uninterrupted and the I/O interface chip 19 transmits data and appropriate control signals through the vehicle electronic interface 26 to vehicle condition monitoring subsystem 7.

FIG. 2-A shows a detail block diagram of a vehicle storage subsystem 9a of the kind described above for 16 sensor inputs 11a with an 8 bit data bus and a 16 bit address bus. It contains similar constituent parts to the vehicle storage subsystem 9 in FIG. 2 with the following clarifications: four remote receiving units 10a, each containing one multiplexer 13a, and one data formatter 12a with four sensor inputs 11a conveniently placed throughout the vehicle; a data routing unit 14a containing one multiplexer as above; clearly defined component sizes for the multiplexers 13a and 14a; a central data processor 31a with a memory decoder 22a; and clearly specified paths between all the components and the ROM 17a. As in FIG. 2, the data associated with sensor inputs 11a are stored in the corresponding memory location. For example, the sensor input 20a data is stored in memory storage device 21a. ROM 17a has sixteen outputs connected to each memory storage device 16a address inputs, two outputs connected to multiplexer 13a, and two outputs connected to the multiplexer in data routing unit 14a. The clock generator 28a and a multiplier chain 34a provide timing clock signals for ROM 17a, data formatter 12a, and counter 18a that cycles through the ROM 17a program. The outputs from I/O interface chips 19a are connected the vehicle electronic interface 26a and the computer interface 8a with the appropriate 8 bit data bus and a 16 bit address bus.

Figure 3:
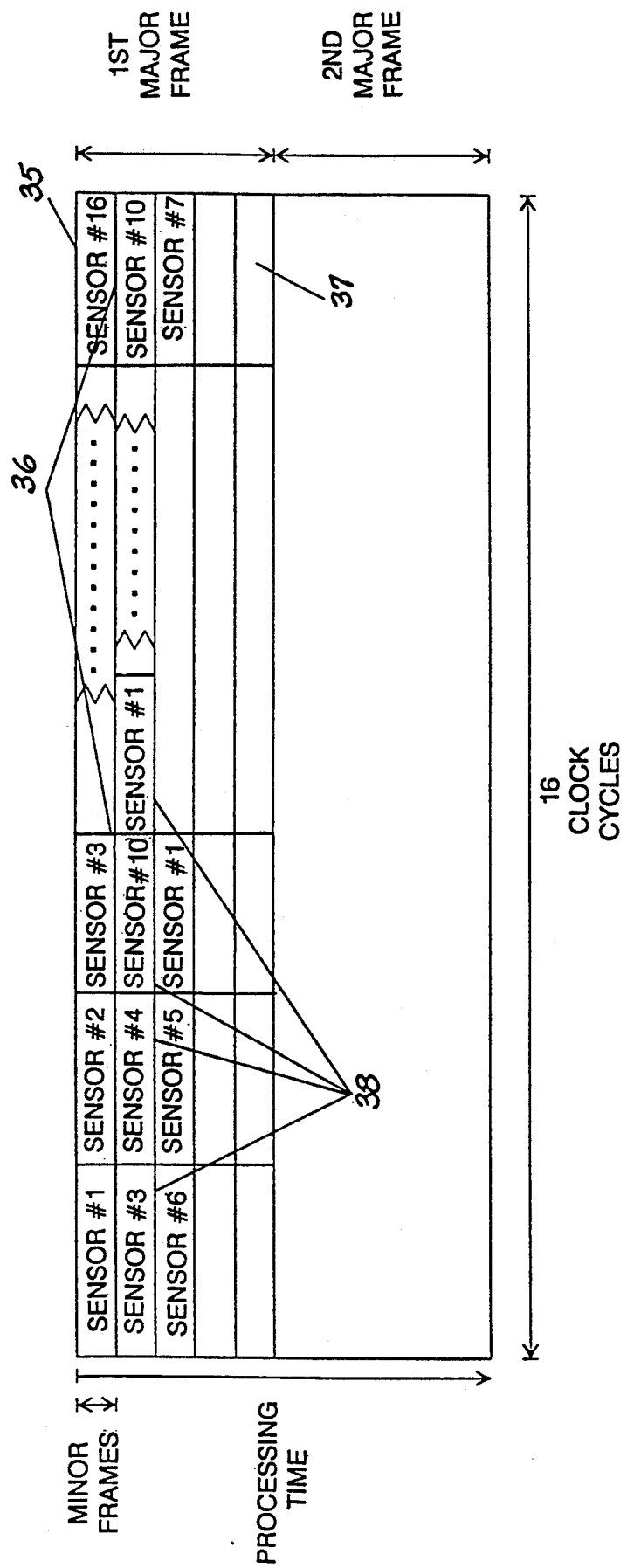

FIG. 3 shows a sample block in time of the order of processing for the system in FIG. 2-A. The illustration reflects storage of sensor data associated with the sensors connected to the sensor inputs in order of precedence as programmed in the ROM for the first 160 clock cycles or two major frames as shown in the figure. Each minor frame constitutes storage of 16 consecutive bytes of sensor data based on 16 clock cycles being stored into memory as defined for this discussion; each major frame is equal to 5 minor frames or storage of 80 consecutive bytes of information 37. One word is equal to 8 bits of analog sensor data or 8 bits of digital sensor data. The system stores one byte of sensor data every clock generator 28 cycle as explained above. Appropriate sensors stored starting with sensor input #1 data and ending with sensor input #16 data 35 in the 1st minor frame. Minor frame 2 constitutes the next sixteen generator clock cycles and shows that sensor input #3 data, sensor input #4 data, sensor input #10 data, and sensor input #1 data 38 are stored sequentially for the first four clock generator cycles. Sensor input #10 data is shown stored twice 36 in minor frame 2. The definition of major and minor frame is arbitrary, but it is proposed that to define the minor frame such that a minor frame contains at most as many clock cycles as there are sensor inputs will provide the best definition so that software resources in ROM reflect hardware design. Critical sensor data is monitored more than once per minor frame while non-critical or slow varying sensor data is monitored only once per major frame.

Figure 4:
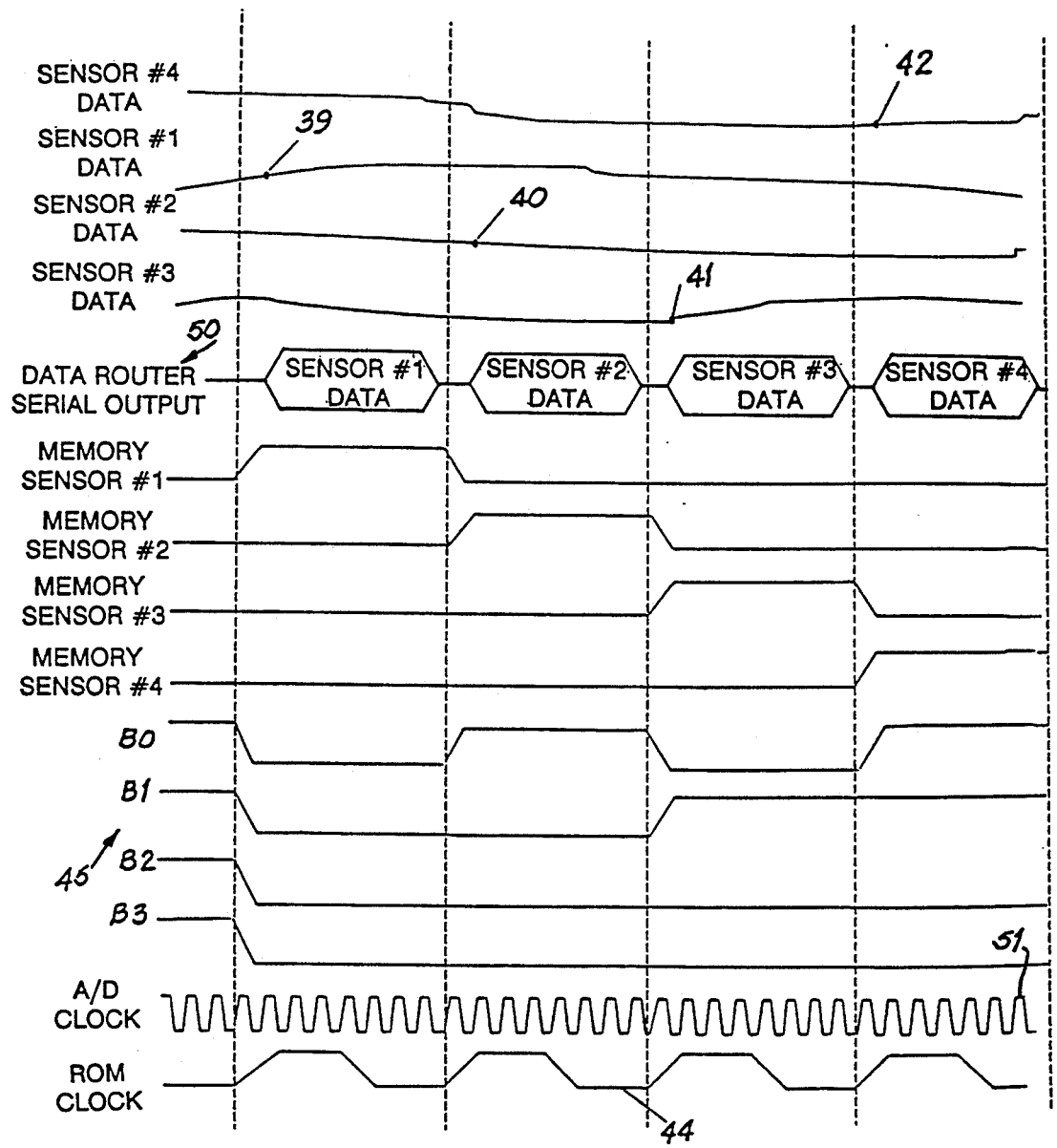
FIG. 4 shows a representative timing diagram for the vehicle storage subsystem in FIG. 2a; and, FIG. 5 shows the ROM memory contents for part of the frame format in FIG. 3.

In referring to vehicle storage subsystem 9a in FIG. 2-A, it is helpful to illustrate by way of example what is happening in the subsystem during the first four ROM clock cycles when the system is activated after the vehicle ignition switch is turned-on. Even though the illustration that follows will focus on the subsystem in FIG. 2-A, it can be easily generalizable and expanded to include any number of sensors including the vehicle storage subsystem 9 in FIG. 2. The discussion will focus around FIGS. 4 and 5 which show a timing diagram for a vehicle storage subsystem 9a and the corresponding ROM 17a contents.

During the 1st minor frame and first ROM or clock generator cycle rising edge, when sensor input #1 data referenced 20a is been stored, the ROM clock 44 and the A/D clock 51 are outputted to data formatter 12a for sampling 39 and digitizing in response to the multiplexer output bits from ROM 17a B0-B3 equal to 0000 50 49 toggling ROM outputs 45 at the inputs to multiplexers 13a and 14a thus causing the serial data corresponding to sensor input #1 to be put on the data router output 50 for transmission to serial to parallel converter 15a. Concurrently, the ROM inputs for HEX address 0000H 52 trigger output bits A0-A15 which are 0000H as shown in FIG. 5 to appear on the address bus while memory decoder 22a input bits C0-C3 46 which are 0000 causes memory enable for storage device #1 designated 21a to toggle from low to high after sensor input #1 data for storage in the appropriate memory storage device 16a with the appropriate address location 0000 H in memory.

During the 1st minor frame and second ROM or generator clock cycle rising edge, when sensor input #2 data is been stored, the ROM clock 44 and the A/D clock 51 are outputted to data formatter 12a for sampling 40 and digitizing in response to the multiplexer output bits from ROM B0-B3 equal to 0001 49 toggling ROM outputs 45 at the inputs to multiplexers 13a and 14a thus causing the serial data corresponding to sensor input #2 to be put on the data router output 50 for transmission to serial to parallel converter 15a. Concurrently, the ROM inputs for HEX address 0001 H 53 trigger output bits A0-A15 which are 0000 H as shown in FIG. 5 to appear on the address bus and memory decoder 22a input bits C0-C3 46 which are 0001 causes memory enable for storage device #2 to toggle from low to high after sensor input #2 data for storage in the appropriate memory storage device 16a with the appropriate address location 0000 H in memory.

During the 1st minor frame and third ROM or generator clock cycle rising edge, when sensor input #3 data is been stored, the ROM clock 44 and the A/D clock 51 are outputted to data formatter 12a for sampling 41 and digitizing in response to the multiplexer output bits from ROM B0-B3 equal to 0010 49 toggling ROM outputs 45 at the inputs to multiplexers 13a and 14a thus causing the serial data corresponding to sensor input #3 to be put on the data router output 50 for transmission to serial to parallel converter 15a. Concurrently, the ROM inputs for HEX address 0002 H 54 trigger output bits A0-A15 which are 0000 H as shown in FIG. 5 to appear on the address bus and memory decoder 22a input bits C0-C3 46 which are 0010 causes memory enable for storage device #3 to toggle from low to high after sensor input #3 data for storage in the appropriate memory storage device 16a with the appropriate address location 0000 H in memory.

During the 1st minor frame and forth ROM or generator clock cycle rising edge, when sensor input #4 data is been stored, the ROM clock 44 and the A/D clock 51 are outputted to data formatter 12a for sampling 42 and digitizing in response to the multiplexer output bits from ROM B0-B3 equal to 0011 49 toggling ROM outputs 45 at the inputs to multiplexers 13a and 14a thus causing the serial data corresponding to sensor input #4 to be put on the data router output 50 for transmission to serial to parallel converter 15a. Concurrently, the ROM inputs for HEX address 0003 H 55 trigger output bits A0-A15 which are 0000 H as shown in FIG. 5 to appear on the address bus and memory decoder 22a input bits C0-C3 46 which are 0011 causes memory enable for storage device #4 to toggle from low to high after sensor input #4 data for storage in the appropriate memory storage device 16a with the appropriate address location 0000 H in memory.

Similarly, all other data from selected sensor inputs are selected, sampled, and stored into memory storage devices 16a. Data is stored in pre-determined sequence corresponding to the minor/major frame format illustrated in FIG. 3. The system format as illustrated for the 1st two minor frames in FIG. 3 is only a glimpse in time showing which sensor input 11 is monitored and how often per minor and major frame.

Thus the reader will see that the vehicle information storage system as proposed in this invention provides a highly reliable, fast, and comprehensive information storage system that can be easily expandable to include add-on sensors and can store data associated with multiple vehicle sensor inputs more intelligently. The invention will permit faster and cheaper vehicle repair with the aid of future computerized diagnostic software and will improve service station automated testing and troubleshooting as well as faster retrieval of stored information via the computer interface. While the information storage subsystem comprises the condition monitoring subsystem and the storage subsystem, both subsystems operate independently while exchanging sensor data occasionally. In particular, the storage subsystem functions independently, but it can also function cooperatively with other vehicle electronics to provide uninterrupted data storage with more than one subsystem connected to interface.

While my above description contains many specificities, these should not be construed as limitations on the scope of the invention, but rather as an exemplification of one preferred embodiment thereof. Many other variations are possible. For example, the storage subsystem used a ROM but it is also possible that in cases where reprogrammability is important to account for variations due to aging on the vehicle performance or to account for anticipated future add-on sensors, UV-erasable EPROMs permit easy erasability without requiring a time consuming separate UV-erase procedure at costs that are much lower than full EEPROMs or ROMs. Additionally, while the system proposed storing sensor data in a specified order and assumed repeating the order after a specified elapsed time in a major or minor frame, the system can have all minor and major frames be unique. Furthermore, while the system proposed storing sensor data that is analogue or digital in the storage subsystem, other criterias can be used to determine what sensors are stored such as critical and/or non-critical sensors. Accordingly, the scope of the invention should be determined not by the embodiments illustrated, but by the appended claims and their legal equivalents.

What is claimed is:

1. A vehicle information storage system for use on a vehicle having a plurality of sensors for producing informational data about the vehicle and for use with an external computer, said information storage system comprising:
   (a) a condition monitoring subsystem comprising a central processing unit adapted to receive data from the sensors and including testing means for performing tests on the data received from the sensors and generating informational outputs based on said tests, and a display unit operatively connected to said central processing unit for displaying the informational outputs from said central processing unit so as to alert a vehicle operator of malfunctions in the vehicle;
   (b) a storage subsystem connected to selected ones of the sensors for storing and transmitting data from the sensors, said storage subsystem including a plurality of memory storage devices, one of said storage devices being provided for each of the sensors to which said storage subsystem is connected, storing means for storing data received from the sensors into that one of said memory storage device devices corresponding to a particular sensor; data control means for generating control signals to control the storing of data in said memory storage devices; prompting means for prompting said conditioning monitoring means during data transmission; and transmission control means for controlling the transmission of data to the external computer clock means for generating a clock signal with clock cycles which is connected to said data control means and said transmission control means;
   (c) a computer interface for connecting said storage subsystem to the external computer comprising an external data bus, an external address bus, and an external control bus so that said transmission control means causes transmission of data on said data bus from said memory storage devices in response to control and address signals from the external computer; and,
   (d) a vehicle electronic interface connecting said storage subsystem to said condition monitoring means comprising a vehicle data bus and a vehicle control bus so that said prompting means sends control signals over said vehicle control bus to said condition monitoring means when stored data from said memory storage means is being transmitted to said condition monitoring means over said vehicle data bus whereby said storage subsystem stores vehicle sensor data associated with one of the selected sensors in said storage subsystem once every clock cycle and transmits the vehicle sensor data stored in said storage subsystem to said condition monitoring subsystem during the same clock cycle during vehicle operation via said vehicle electronic interface and further transmitting selected sensor data from said memory storage devices to said external computer via said computer interface in response to said control and address bus signals from the external computer when the vehicle is not operational.

2. The vehicle information storage system of claim 1, wherein said data control means is preprogrammed to cause storage of the sensor data from the plurality of sensors to be sampled and stored at different rates so that critical or fast varying sensor data is stored more often than less critical or slower varying sensor data.

3. The vehicle information storage system of claim 2 for use on the vehicle where the sensors are located at different locations on the vehicle remotely of said memory storage devices in said storage subsystem, wherein said storing means in said storage subsystem comrpises:
   a plurality of remote receiving units, each of said remote receiving units connected to the sensors in the same location on the vehicle, said receiving units distributed in the vehicle so that each of said receiving units is located in the vicinity of the sensors to which said remote receiving unit is connected; and,
   data routing means connecting said remote receiving units to said memory storage devices so that data received from said sensors is transmitted to said memory storage devices through said remote receiving units and said data routing means, said data routing means located at an intermediate prescribed location on the vehicle between said remote receiving units and said memory storage devices so as to reduce the number of wires between the sensors and said remote receiving units, between said remote receiving units and said data routing unit, and between said data routing unit and said memory storage devices.

4. The vehicle information storage system of claim 1, wherein said data control means of said storage subsystem comprises a ROM, said ROM having information stored therein to select which sensor of said sensors from which such data will be stored, which of said memory storage devices on which such data will be stored, and which memory address location in said memory storage device such data will be stored to store sensor data for the life of the vehicle with such stored data is available to the external computer for vehicle servicing and diagnosing.

5. The vehicle information storage system of claim 1 wherein said data control means controls the rate at which data from each of the sensors is stored so that the rate of data storage from each of said sensors is directly proportional to the frequency content of the data associated with a monitored sensor, the probability of a fault occurring that causes the sensor data of the monitored sensor input to fluctuate unusually, and the probability of a malfunction in the sensor itself.

6. A vehicle information storage subsystem for use on a vehicle having a plurality of sensors for producing informational data about the vehicle and vehicle subsystems using the informational data from the sensors and for use with an external computer, said information storage subsystem comprising:
 (a) a plurality of remote receiving units, each of said remote receiving units connected to said plurality of the sensors for receiving data therefrom;
 (b) a plurality of data storage means, one of said data storage means corresponding to each of the sensors for selectively storing data from the sensors corresponding thereto at an addressable locations therein;
 (c) data routing means for routing data signals from said remote receiving units to said data storage means;
 (d) a vehicle electronic interface comprising a data bus and a control bus connected to the other vehicle subsystems so that data stored in said data storage means can be transmitted to the vehicle subsystems over said data bus and controlled over said control bus;
 (d) a ROM having data control information recorded therein, said ROM operatively connected to said remote receiving units, said data storage means, said data routing means, and said data storage means so that said data control information recorded therein causes the informational data from a particular sensor to be recorded in said data storage means at a location having an unique address;
 (e) clock means generating a timing signal with prescribed clock cycles so that the data control information recorded in said ROM causes said data storage means to store the vehicle sensor data associated with each of said sensors once every clock cycle of said clock cycles and transmit the data stored to the other vehicle subsystems during the same clock cycle while the vehicle is operating via said vehicle electronic interface and further transmitting selected sensor data from said data storage means from said data storage means to an external computer in response to control and address information from the external computer when the vehicle is not operating.

7. The vehicle information storage subsystem of claim 6, wherein said data control information recorded in said ROM causes certain critical or fast varying data from certain of the sensors to be stored more often than less critical or slower varying data from certain other of the sensors during operation of the vehicle.

8. The vehicle information storage subsystem of claim 7, wherein said data routing means is located at a convenient midway point in the vehicle between said remote receiving units and the other components of said storage subsystem so as to reduce the number of wires between the sensors and said remote receiving units, between said remote receiving units and said data routing unit, and between said data routing unit and said data storage means and said ROM.

9. A vehicle information subsystem for use on a vehicle having a plurality of sensors for producing informational data about the vehicle for use with a computer controlled monitoring system, where said storage subsystem stores the informational data independently of the computer controlled monitoring system, said information subsystem comprising:
 a plurality of memory storage devices,
 data control means without a microprocessor connecting each of said storage devices to one of the sensors to control the storing of data in said memory storage devices and for controlling the transmission of data from said memory storage devices; and,
 clock means for generating a reference signal to said data control means.

10. The vehicle information subsystem of claim 9 further comprising:
 wiring for operatively connecting the sensors with said information subsystem; and,
 a plurality of remote receiving units, each of said remote receiving units including multiplexing means operatively connected to said plurality of the sensors, to said data control means, to said memory storage devices, and to said clock means to reduce said wiring used to connect the various components of said system.

11. The vehicle information subsystem of claim 9 wherein said data control means further comprises:
 a ROM having data control information recorded therein, said ROM operatively connected to said clock means, and said plurality of memory storage devices so that said data control information recorded therein causes the informational data from a particular sensor to be recorded in said memory storage devices at a location having an unique address in response to said reference signal from said clock means.

12. The vehicle information subsystem of claim 9 wherein said computer controlled monitoring system further drives a display system for visually displaying information based on the informational data provided by the sensors, and further including:
 interface means connecting said memory storage devices and said data control means to the computer controlled monitoring system for transmitting data from said memory storage devices to the computer controlled monitoring system under the control of said data control system;

13. The vehicle information subsystem of claim 9 for use with an external computer capable of providing control and address signals, and further including:
 interface means connecting said memory storage devices and said data control means to the external computer for transmitting data from said memory storage devices to the external computer in response to control and address signals from the external computer.

14. The vehicle information subsystem of claim 9 wherein said computer controlled monitoring system further drives a display system for visually displaying information based on the informational data provided by the sensors, for use with an external computer capable of providing control and address signals, and further including:

interface means connecting said memory storage devices and said data control means to the computer controlled monitoring system for transmitting data from said memory storage devices to the computer controlled monitoring system under the control of said data control system while the vehicle is operating, and connecting said memory storage devices and said data control means to the external computer for transmitting data from said memory storage devices to the external computer in response to control and address signals from the external computer when the vehicle is not operating.

15. The vehicle information subsystem of claim 14 further comprising:

wiring for operatively connecting the sensors with said information subsystem; and, a plurality of remote receiving units, each of said remote receiving units including multiplexing means operatively connected to said plurality of the sensors, to said data control means, to said memory storage devices, and to said clock means to reduce said wiring used to connect the various components of said system.

16. The vehicle information subsystem of claim 14 wherein said data control means further comprises:

a ROM having data control information recorded therein, said ROM operatively connected to said clock means, and said plurality of memory storage devices so that said data control information recorded therein causes the informational data from a particular sensor to be recorded in said memory storage devices at a location having an unique address in response to said reference signal from said clock means.

17. The vehicle information subsystem of claim 16 further comprising:

wiring for operatively connecting the sensors with said information subsystem; and, a plurality of remote receiving units, each of said remote receiving units including multiplexing means operatively connected to said plurality of the sensors, to said data control means, to said memory storage devices, and to said clock means to reduce said wiring used to connect the various components of said system.

18. The vehicle information subsystem of claim 17 further comprising;

data routing means connecting said remote receiving units to said memory storage devices so that data received from said sensors is transmitted to said memory storage devices through said remote receiving units and said data routing means, said data routing means located at an intermediate prescribed location on the vehicle between said remote receiving units and said memory storage devices so as to reduce the wiring between the remote receiving units and said data routing unit, and between said data routing unit and said memory storage devices.

* * * * *